(12) United States Patent
McClay

(10) Patent No.: US 9,326,455 B2
(45) Date of Patent: May 3, 2016

(54) PLANT CONTAINER COVER AND INSULATION

(71) Applicant: James McClay, Orland Park, IL (US)

(72) Inventor: James McClay, Orland Park, IL (US)

(*) Notice: Subject to any disclaimer, the term of this patent is extended or adjusted under 35 U.S.C. 154(b) by 71 days.

(21) Appl. No.: 14/092,381

(22) Filed: Nov. 27, 2013

(65) Prior Publication Data
US 2015/0143743 A1 May 28, 2015

(51) Int. Cl.
*A01G 9/02* (2006.01)

(52) U.S. Cl.
CPC ........................................ *A01G 9/02* (2013.01)

(58) Field of Classification Search
CPC ......... A01G 9/02; A01G 9/026; A01G 9/028; A01G 9/104
USPC .......... 47/29.1, 29.2, 29.4, 29.6, 31, 65, 66.7, 47/86; 119/51.01, 61.5, 61.55, 61.56, 174; 220/573.5, 575, 23.2, 23.6, 23.87, 220/23.88, 23.89, 504
See application file for complete search history.

(56) References Cited

U.S. PATENT DOCUMENTS

| | | | | |
|---|---|---|---|---|
| 2,798,335 A | | 7/1957 | Downey | |
| 2,798,631 A | * | 7/1957 | Engel ................. | B65D 43/0266 220/266 |
| 3,266,188 A | * | 8/1966 | Budd .............................. | 47/29.6 |
| 3,704,545 A | * | 12/1972 | Van Reisen ........................ | 47/69 |
| 3,934,747 A | * | 1/1976 | Needt ..................... | B65D 11/02 220/4.05 |
| 4,135,331 A | * | 1/1979 | Lamlee ............................. | 47/61 |
| 4,181,612 A | * | 1/1980 | Trail ....................... | A01K 63/04 119/246 |
| 4,291,493 A | * | 9/1981 | Monson ............................ | 47/14 |
| 4,291,494 A | * | 9/1981 | Knablein et al. .................... | 47/17 |
| 4,772,418 A | * | 9/1988 | Leoncavallo .................. | 422/310 |
| 4,923,704 A | * | 5/1990 | Levinson ............... | A47J 36/027 219/730 |
| 4,972,963 A | * | 11/1990 | Guarriello ........... | B29C 49/4802 215/383 |
| 5,012,765 A | * | 5/1991 | Naso et al. ..................... | 119/166 |
| 5,098,676 A | * | 3/1992 | Brooks, Jr. ..................... | 422/292 |
| 5,168,834 A | * | 12/1992 | Buschur ......................... | 119/166 |
| 5,441,707 A | * | 8/1995 | Lewis et al. .................... | 422/300 |
| 5,490,975 A | * | 2/1996 | Dane ............................. | 422/300 |
| 5,518,115 A | * | 5/1996 | Latulippe ............... | B65D 25/10 206/370 |
| 5,727,691 A | * | 3/1998 | Vittrup .......................... | 209/235 |
| 6,401,409 B1 | * | 6/2002 | Martin ..................... | E04H 9/12 220/4.24 |
| 6,546,849 B1 | * | 4/2003 | Shimazaki ....................... | 99/413 |

(Continued)

OTHER PUBLICATIONS

Janet Hall, 10 Easy Pieces: Plant Blankets, Gardenista, Jan. 9, 2013, available at http://www.gardenista.com/posts/10-easy-pieces-plant-blankets.

(Continued)

*Primary Examiner* — Kristen C Hayes
*Assistant Examiner* — Ebony Evans
(74) *Attorney, Agent, or Firm* — Cherskov Flaynik & Gurda LLC

(57) ABSTRACT

The present invention provides an apparatus for plants, said apparatus that features a planter with a closed bottom, sidewalls, and an open top, wherein a protruding lip is defined on an exterior surface of the sidewalls in proximity to the open top; and a first cover with an open bottom, sidewalls, and a closed top, wherein a set of clasping mechanisms are located on two opposing sidewalls in proximity to the open bottom, and wherein the clasping mechanism reversibly attaches the cover to the lip of the planter. The invention further provides a second, insulating cover with an open bottom, sidewalls, and a closed top, wherein the second cover is received by the first cover after the first cover is reversibly attached to the planter.

14 Claims, 16 Drawing Sheets

(56) References Cited

U.S. PATENT DOCUMENTS

| | | | |
|---|---|---|---|
| 6,585,942 B1* | 7/2003 | Bussell et al. | 422/300 |
| 6,874,634 B2* | 4/2005 | Riley | 206/439 |
| 7,536,828 B2 | 5/2009 | Slingerland et al. | |
| 8,343,560 B2* | 1/2013 | Blythe | B65D 11/188 220/4.21 |
| 8,733,291 B2* | 5/2014 | Dunigan | 119/463 |
| 2010/0024294 A1* | 2/2010 | Kertz | 47/29.1 |
| 2013/0291802 A1* | 11/2013 | Carpentieri | A01K 7/027 119/72 |

OTHER PUBLICATIONS

Hot House Germination Station Heat Mat Tray Dome 72 Cell Pack Starter Garden, EBay, available at http://www.ebay.com/itm/Hot-House-Germination-Station-Heat-Mat-Tray-Dome-72-Cell-Pack-Starter-Garden-NEW-/281683891346?pt=LH_DefaultDomain_0&hash=item4195ab1492.

Get ahead and Beat the Frost, Burgon & Ball, available at http://www.burgonandball.com/press-room/newsroorn_client.php?cid=23&Section=pressview&pid=25.

* cited by examiner

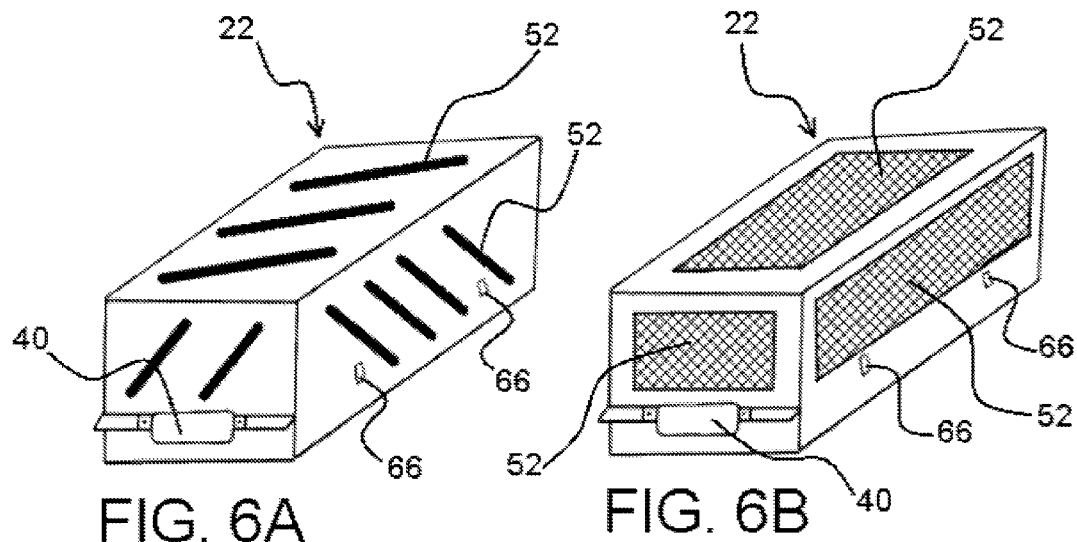
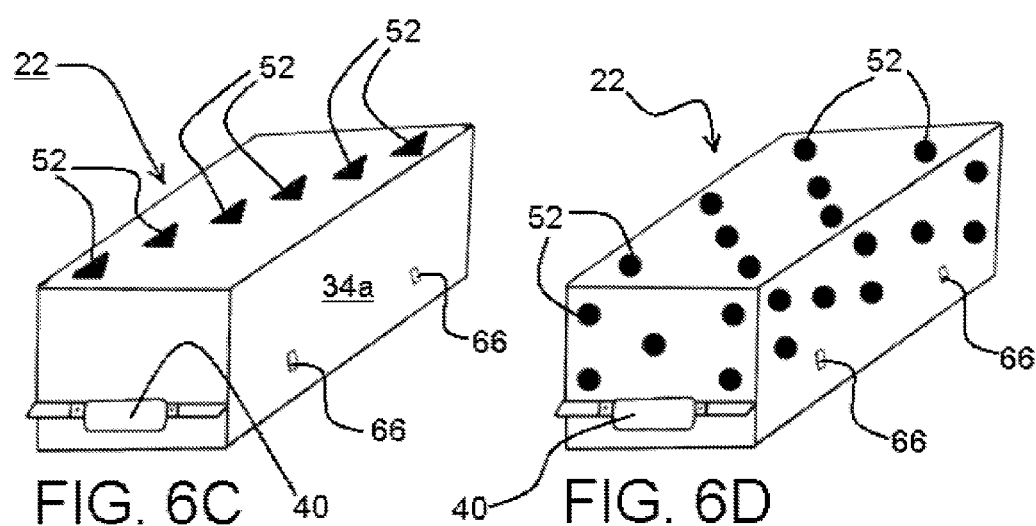
FIG. 6A  FIG. 6B  FIG. 6C  FIG. 6D

PLANT CONTAINER COVER AND INSULATION

BACKGROUND OF THE INVENTION

1. Field of the Invention

This invention is directed to a set of covers for a planter in which at least one cover provides protection from intrusion by animals while a second cover provides additional optional thermal insulation.

2. Background of the Invention

Planters are popular among gardeners. They allow gardeners to start growing plants indoors and later move them outside; they are portable to allow for frequent customization of gardening spaces; they allow people, such as city dwellers, to plant foliage in places where there is no available soil; and the planter itself can be a decorative addition to a garden scape.

However, planters are susceptible to outdoor animals and changes in weather. Planters are frequently the target of rabbits, squirrels, chipmunks, deer, and birds, which all have been known to feast on freshly planted bulbs and, especially, young plants. Garden animals can be particularly aggressive in the early spring as they are hungry after a long winter.

Additionally, plants in planters feel the effect of a sudden freeze more so than plants rooted in the ground because planters are unable to take full effect of the inherent insulating properties of the soil. Planters provide a much smaller volume of surrounding soil from which heat can be drawn. Plants in a planter are thus more vulnerable to the unpredictable swings in the weather in the spring and fall.

Some attempts have been made to address the problems of animals and weather individually. For instance, meshes, nylons, or burlaps can be purchased to help shield plants from the cold, but they do not provide any protection from animals. Some planters have rigid covers, but they are not hardy enough for outdoor use. Still other planters have internal heaters, but these heaters require external power sources, are a hazard, and incur high costs.

Thus a need exists in the art for a planter or a modification to a planter that solves the prior art problems of outdoor critters and harsh cold spells.

SUMMARY OF THE INVENTION

An object of the present invention is to provide protection from animals and inclement weather within the same system. A feature of the present invention is a system of covers in which one protects against access by animals and a second provides insulation from cold weather. An advantage of the present invention is that a user can address both of these two common problems with a single system instead of choosing only one problem to address as frequently required in the prior art.

An object of the present invention is to prevent typical garden and yard animals, like rabbits, squirrels, birds, deer, and chipmunks, from uprooting bulbs or seedlings in a planter. A feature of the present invention is a cover with a clasping mechanism that securely attaches the cover to the planter. A further feature of the present invention is that the cover is air permeable so that water, air, and sunlight can reach newly planted seeds, seedlings, and bulbs. An advantage of the present invention is that the cover allows planters to be left outdoors without the owner having to worry that newly planted bulbs or seeds will not have a chance to grow.

An object of the present invention is to shield plants in outdoor planters from sudden frosts. A feature of the present invention is an insulating cover that will trap heat from the plants in the adjacent atmosphere. An advantage of the present invention is that the insulating cover provides up to 15° F. of insulation protection. A further advantage of the present invention is that planters will not have to be brought indoors in anticipation of cold weather.

An object of the present invention is to provide a system of covers that are customizable. A feature of the present invention is that the tamper protection cover and the insulating cover can be used simultaneously or independent of one another. An advantage of the present invention is that the user can choose which covers to apply depending on the weather and wildlife in the user's area.

An object of the present invention is to provide a system of covers that can be fitted to preexisting planters. A feature of the present invention is the snap-lock handles that can be fitted to any planters with a peripheral lip. An advantage of the present invention is that a user can continue to use old planters. A further advantage is that a user does not have to replant previously planted flowers to adapt the invention to the user's planter.

An object of the present invention is to provide a system of covers that can be used with terra cotta pots and other rimless planters. A feature of the present invention are the clasping mechanisms with gripping surfaces that provide a tight frictional engagement between the cover and the planter. An advantage of the present invention is that the user is not limited in the selection of the type of planter or pot that can be protected.

The present invention provides an apparatus for plants, said apparatus comprising a planter with a closed bottom, sidewalls, and an open top, wherein a protruding lip is defined on an exterior surface of the sidewalls in proximity to the open top; and a first cover with an open bottom, sidewalls, and a closed top, wherein a set of clasping mechanisms are located on two opposing sidewalls in proximity to the open bottom, and wherein the clasping mechanism reversibly attaches the cover to the lip of the planter.

The present invention also provides a second, insulating cover with an open bottom, sidewalls, and a closed top, wherein the second cover is received by the first cover after the first cover is reversibly attached to the planter.

BRIEF DESCRIPTION OF THE DRAWINGS

The invention together with the above and other objects and advantages will be best understood from the following detailed description of the preferred embodiment of the invention shown in the accompanying drawings, wherein:

FIGS. 6A-D are perspective views of the first cover in accordance with the features of the present invention;

DETAILED DESCRIPTION OF THE INVENTION

The foregoing summary, as well as the following detailed description of certain embodiments of the present invention, will be better understood when read in conjunction with the appended drawings.

As used herein, an element step recited in the singular and preceded with the word "a" or "an" should be understood as not excluding plural said elements or steps, unless such exclusion is explicitly stated. Furthermore, the references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Briefly, in one embodiment, the present invention 10 is directed to a planter 20 with a first cover 22 and a second cover 24. The first cover 22 provides tamper protection, such as from animals, while a second cover 24 provides thermal insulation against a sudden frost or drop in temperature. In one embodiment, the first cover 22 and second cover 24 are used together, and in an alternative embodiment, the covers may be used independently of one another.

Figure 1:
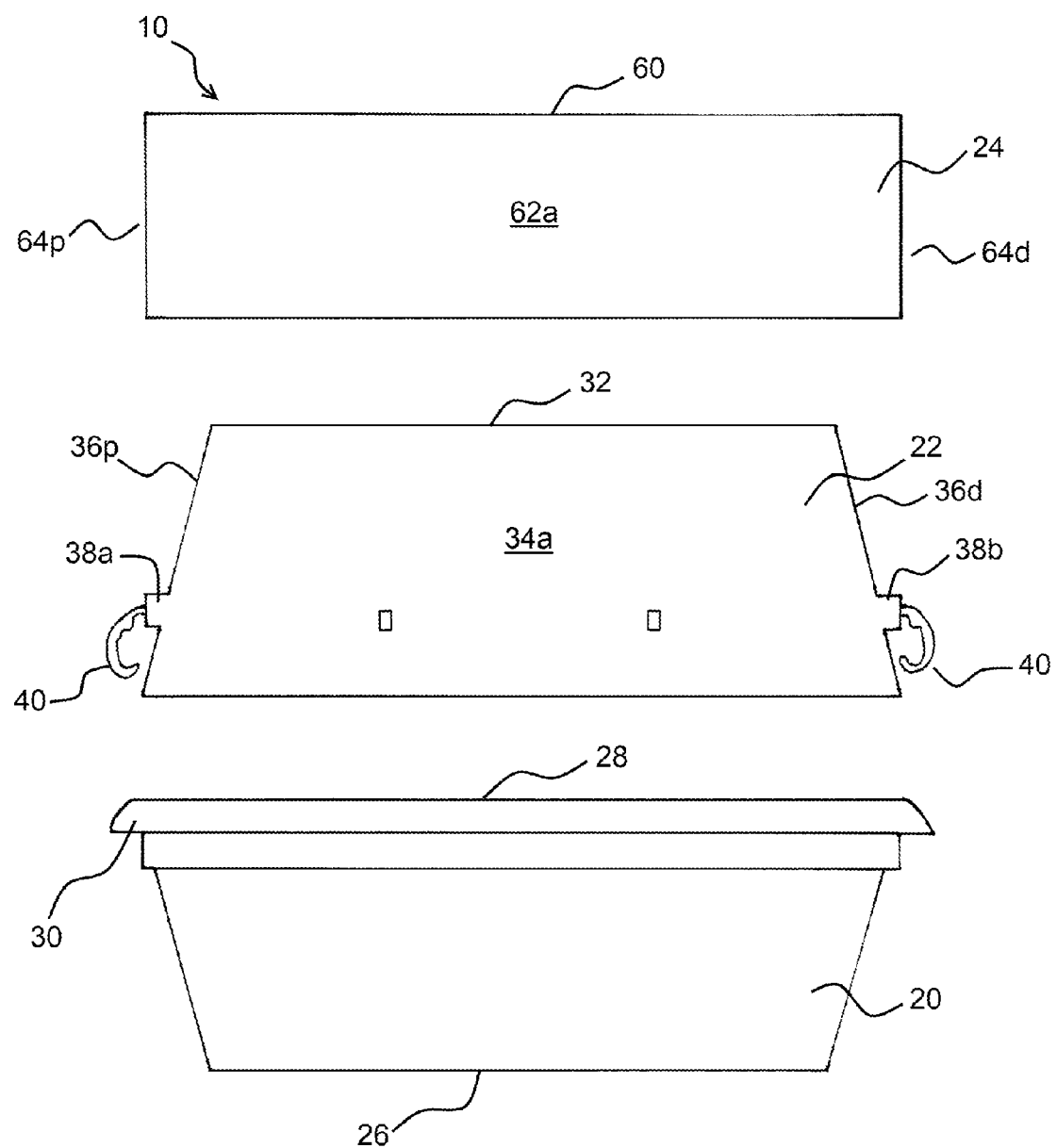
FIG. 1 is an exploded view of the planter and covers in accordance with the features of the present invention.

As can be seen in the embodiment shown in FIG. 1, the present invention 10 comprises two pieces: the first cover 22 and the second cover 24. The two covers are placed over a planter 20. The planter 20 has a bottom portion 26, a top portion 28, and a peripheral lip 30 around the top portion 28. As depicted in the side view of the embodiment of FIG. 1, the planter 20 takes the shape of an inverted trapezoidal prism; however, other shaped planters may be used, such as other polygonal prisms and cylinders. The planter 20 is hollow on the inside and open at the top portion 28. Soil is deposited through the open top portion 28 into the cavity of the planter 20, and bulbs, seeds, or seedlings are then inserted into the soil. The bottom portion 26 of the planter 20 may have a drainage means, such as small holes, slits, screens, or a combination of the preceding formed into the bottom portion 26. As further depicted in FIGS. 1 and 2, the peripheral lip 30 surrounds the entire top portion 28; although, in other embodiments, the peripheral lip 30 does not surround the entire top portion 28. In those embodiments, the peripheral lip 30 extends along the two opposing shorter sides of the top portion 28.

Figure 4:
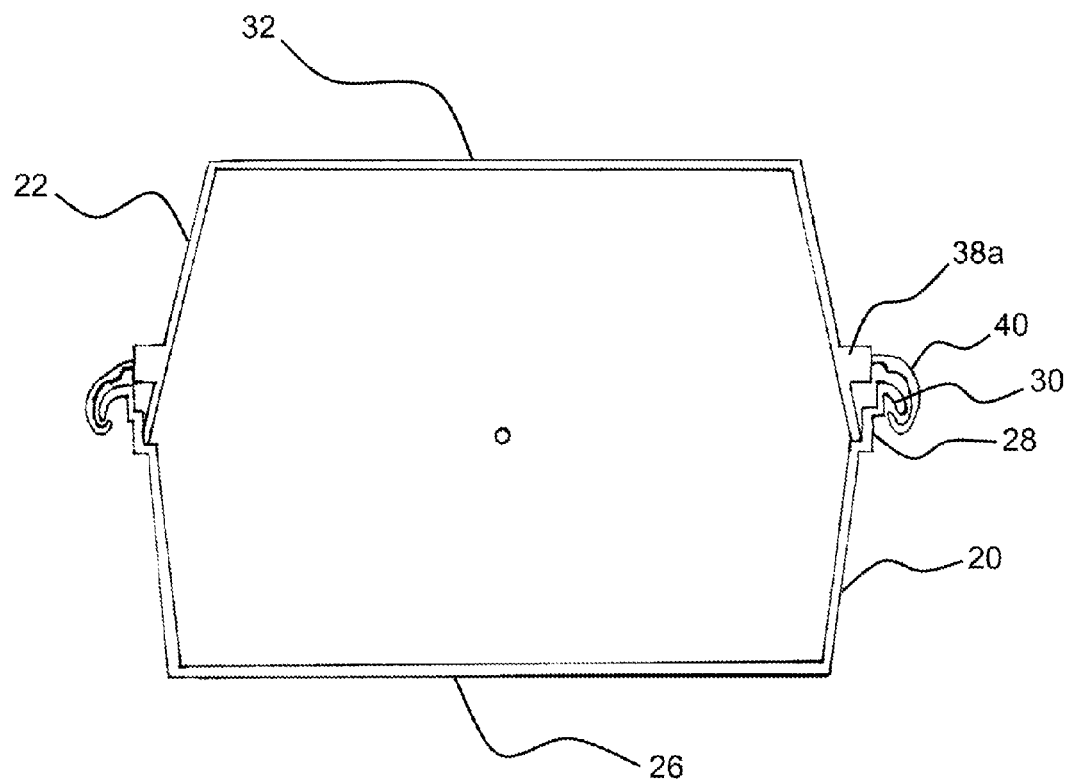
FIG. 4 is a sectional view of the planter and first cover in the closed configuration taken along line 4-4 as depicted in FIG. 3.

A cross-section of the peripheral lip 30, according to one embodiment, is discussed herein and shown in FIG. 4 discussed below.

The First Cover

Figure 2:
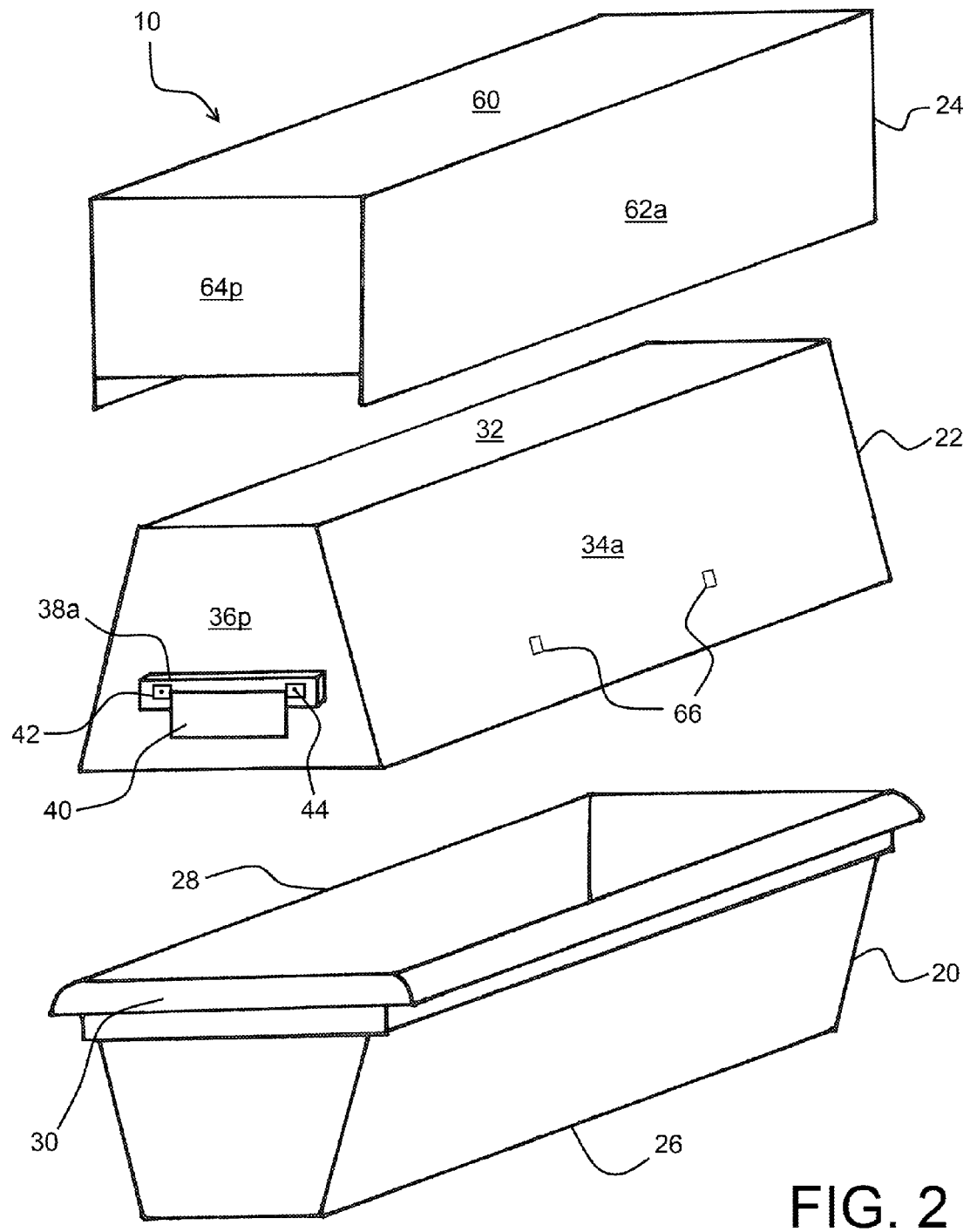
FIG. 2 is a perspective exploded view of the planter and covers.

FIG. 2 depicts an embodiment of the first cover 22 that features a top 32, two longitudinal sidewalls 34a and 34b, a proximate face 36p, and a distal face 36d that define a polyhedron wherein the side opposite of the top 32 is open. In the embodiment depicted in FIG. 2, the first cover 22 has substantially the same shape as the planter 20, but in other embodiments, the first cover 22 features a different shape. In still another embodiment, the first cover 22 is a modified and inverted planter 20, with the necessary modifications to the planter discussed below. Extending from the proximal 36p and distal 36d faces are protrusions 38a and 38b, respectively. On each protrusion 38a and 38b is a clasping mechanism 40.

Figure 3:
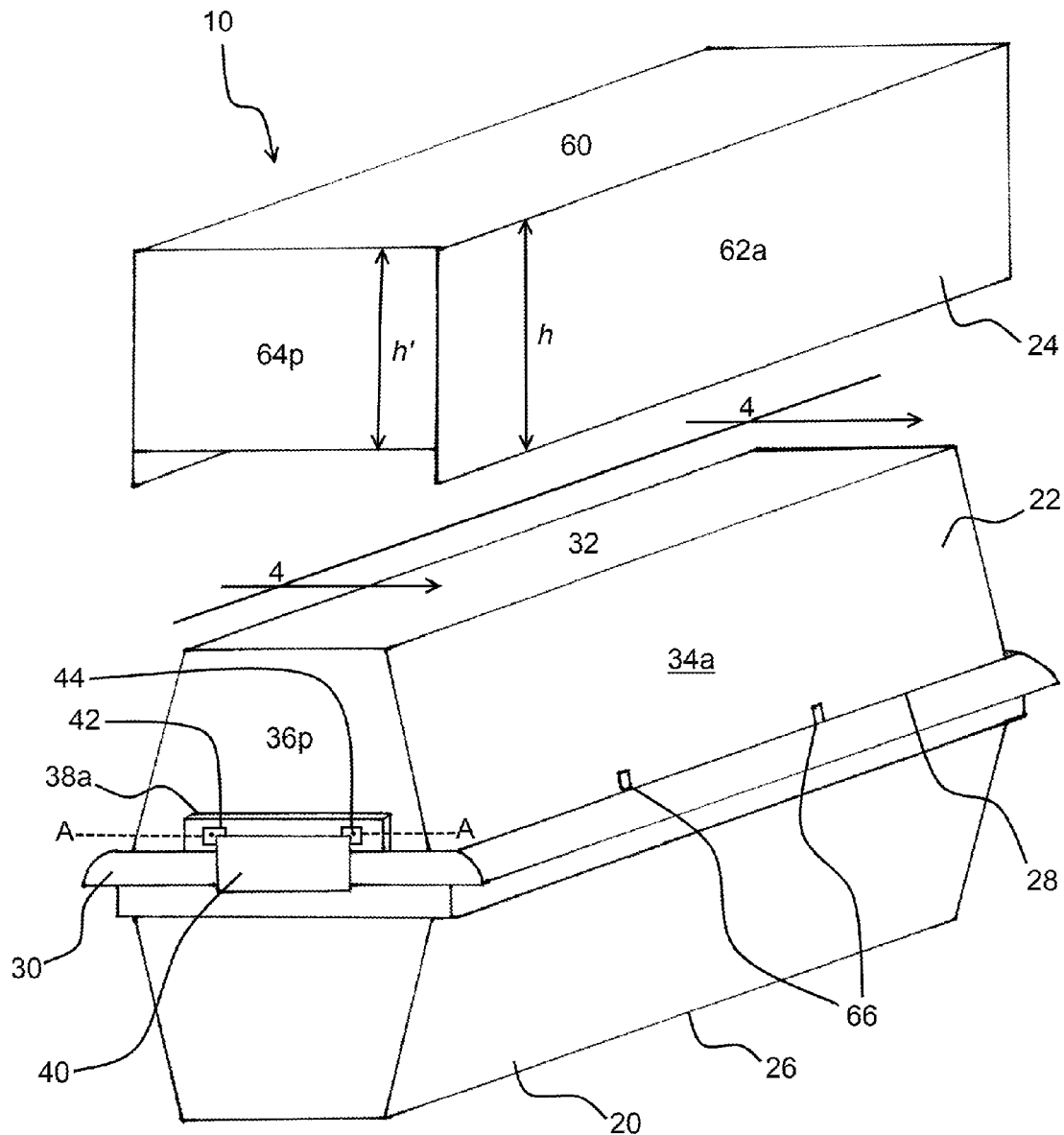
FIG. 3 is a perspective view of the planter and first cover in the closed configuration with the second cover overhead.

FIG. 3 depicts the first cover 22 engaging the planter 20 according to one embodiment. FIG. 4 is a sectional view of the first cover 22 engaging the planter 20 taken along line 4-4 in FIG. 3. As can be seen in FIG. 4. The side opposite of the top 32 of the first cover 22 defines a smaller opening than the opening defined by the top portion 28 of the planter 20. Thus, the first cover 22 is partially received into the interior of the planter 20 to the extent that the longitudinal sidewalls 34a and 34b and proximal 36p and distal 36d faces engage either the interior surfaces of the walls of the planter 20. In addition, the sidewalls 34a and 34b may engage the soil within the planter 20. In one embodiment, the protrusions 38a and 38b engage the top portion 28 of the planter 20. These contacts between the first cover 22 and the planter 20 or the soil and between the protrusions 38a and 38b and the top portion 28 establish the position of the first cover 22 relative to the planter 20. The clasping mechanism 40 securely holds that position against tampering. The details of one embodiment of the clasping mechanism 40 are discussed below although several other mechanisms are easily envisioned.

Figure 5:
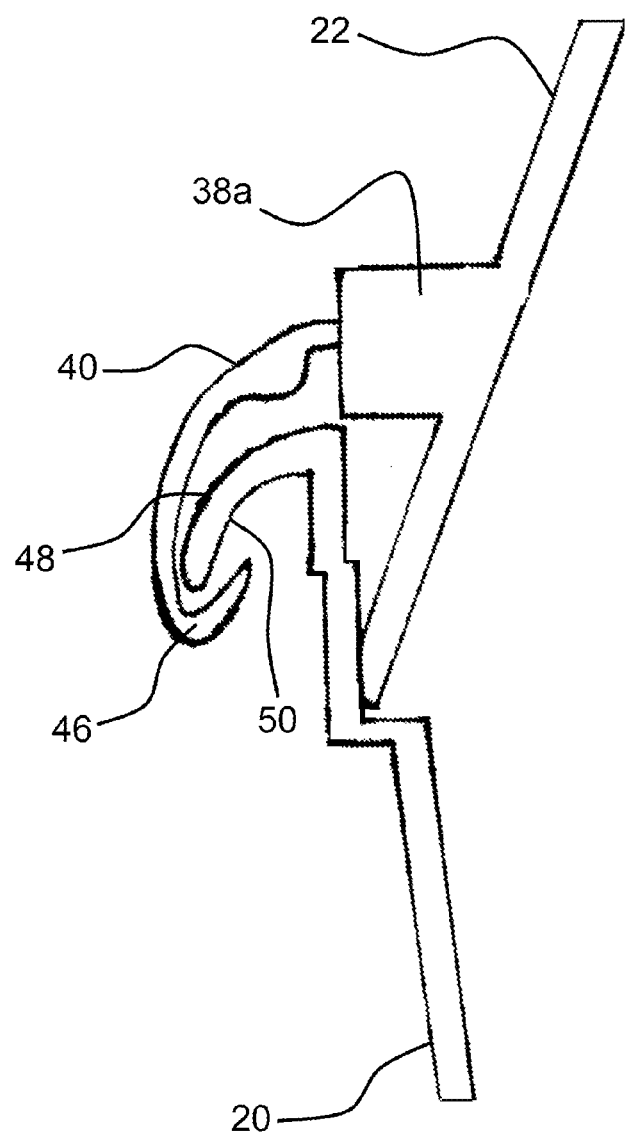
FIG. 5 is a detail view of the clasping mechanism in the closed configuration.

FIG. 5 is a detailed view of one embodiment of the clasping mechanism 40 on the proximal face 36p of the first cover 22. In one embodiment, the distal face 36d includes a clasping mechanism (not shown) analogous to the mechanism depicted for the proximal face 36p shown in FIG. 5. While a variety of means can be used, the clasping mechanism 40, as depicted in FIG. 5, comprises a handle that snaps over the peripheral lip 30. The protrusion 38a provides an opposing surface on which the clasping mechanism 40 is secured. The clasping mechanism 40 is secured to the protrusion 38a via a fixture 42. The fixture 42 can be affixed to the protrusion 38a using a variety of means, including a threaded attachment or a metal or plastic rivet. In one embodiment, the clasping mechanism 40 has a portion that is integrally molded to the first cover 22 obviating the need for the fixture 42. In another embodiment, the clasping mechanism 40 is attached to the proximal wall 36p using an adhesive. In FIG. 5, a plastic rivet 44 secures the fixture 42 to the protrusion 38a.

The fixture 42 must allow for the clasping mechanism 40 to attach and detach as the user desires. Since the clasping mechanism 40 in this embodiment is a snap-lock handle, the fixture 42 must allow rotation about the axis A-A as depicted in FIG. 3. Such rotation can be accommodated by affixing the clasping mechanism 40 to the fixture 42 by a variety of means, including a pin and socket joint, a hinge joint, or other types of cylindrical joints.

Still referring to FIG. 5, the clasping mechanism 40 rotates in a counter-clockwise direction about axis A-A (depicted in FIG. 3) in order to engage the peripheral lip 30. The clasping mechanism 40 has a depending end 46. The depending end 46 contacts the exterior surface 48 of the peripheral lip 30, and then, under user inputted pressure, the depending end 46 deflects the peripheral lip 30 in such a way so the depending end 46 can slide past the leading edge of the peripheral lip 30. Thus, in the embodiment shown, the clasping mechanism 40 requires the peripheral lip 30 to be made of a rigid, yet deflectable, material. Varieties of plastic materials and metals have the necessary rigidity and springiness to deflect under user pressure and are suitable for construction of the peripheral lip 30.

The protrusions 38a and 38b not only provide a opposing surface on which to attach the clasping mechanism 40, but the protrusions 38a and 38b also help to rigidly affix the first cover 22 to the planter 20. The protrusions 38a and 38b are made of a flexible material that compresses under the user pressure applied to latch the clasping mechanism 40. When the user pressure is removed, the protrusions 38a and 38b spring back towards their original position, providing upward tension on the clasping mechanism 40. The upward tension creates a tight engagement between the depending end 46 of the clasping mechanism 40 with the interior surface 50 of the peripheral lip 30, which helps ensure that the clasping mechanism 40 will not accidentally slip past the peripheral lip 30. Further, the protrusions 38a and 38b serve as a resting dock for the second cover 24.

The clasping mechanism 40 as depicted in the figures and described in the previous description is a snap-lock-style handle. However, other clasping mechanisms 40 can be employed, such as a latching clasp, wire clasps, a latch secured by a pin, such as a cotter pin, or a tie system. In all embodiments, the clasping mechanism 40 must rigidly and reversibly attach the first cover 22 to the planter 20. Further, since planters 20 come in all shapes and sizes, the geometry of the clasping mechanism 40 can be altered to accommodate different lip curvatures and cross sections. For instance, if the planter 20 is elliptical in shape, the clasping mechanism 40 can be curved to accommodate the curvature of the peripheral lip 30, or a narrower width on the clasping mechanism 40 can be used.

Turning to the alternative embodiments of the first cover 22 shown in FIGS. 6A to 6D, the first cover 22 allows access to sunlight, air, and moisture. For this purpose, vents 52 are formed into the top 32, longitudinal sidewalls 34a and 34b, proximal face 36p, and distal face 36d. The vents 52 are placed on a single surface or multiple surfaces. The vents 52 use a number of shapes, including narrow slits (FIG. 6A), can include a wire mesh screen (FIG. 6B), triangular cutouts (FIG. 6C), or circular holes (FIG. 6D). In these embodiments, the shape and size of the vents 52 is selected to allow for adequate passage of sunlight, air, and water, while also excluding animals from accessing the plants or seeds. In the most preferred embodiment, the vents 52 are angled slits, having a width of ¼ to ⅜ inches and being spaced approximately 2 inches apart. The first cover can be made from a variety of materials, including plastics, such as high or low density polyethylene, polyethylene terephthalate, poly(vinyl chloride), polypropylene, acrylonitrile butadiene styrene, polycarbonate, and combinations thereof; composite materials, such as those containing graphite, carbon fiber, nylon, and Kevlar®; and metals, such as aluminum, tin, coated steels, stainless steel, copper, coated iron, magnesium, titanium, and alloys thereof. As depicted in FIGS. 6A-D, the first cover 22 is a rectangular prism; however, other shapes are easily envisioned.

Figure 7:
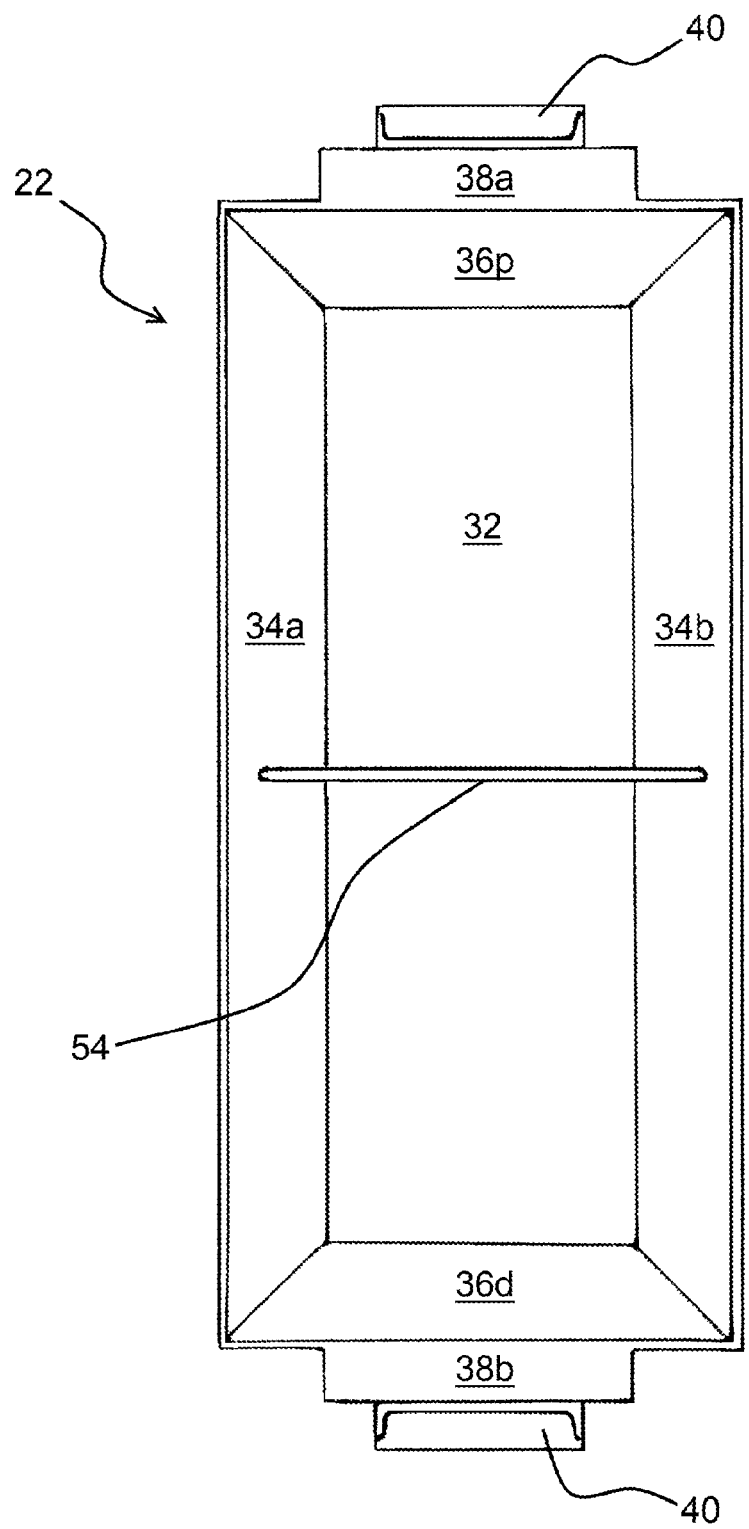
FIG. 7 depicts an embodiment of the first cover featuring a crosspiece.

The first cover 22 can also be modified to include a reinforcement crosspiece 54 as depicted in FIG. 7. The one crosspiece 54 is a rigid circular or square member that prevents the sides of the first cover 22 from being pushed in by an animal. In a preferred embodiment, the crosspiece 54 is placed between the first and second longitudinal sidewalls 34a and 34b approximately ½" from the bottom of and in the middle of the longitudinal sidewalls 34a and 34b. As depicted in FIG. 7, there is a single crosspiece 54, but multiple crosspieces 54 can be used. The crosspiece 54 can be made of the same material as the first cover 22 or a different material. The crosspiece 54 can be joined to the first cover 22 in a variety of ways, including, but not limited to, glues, thermal fusion, screws, pins, rivets, adhesives, and bonding agents.

In a particular embodiment, the first cover 22 is made from an unused second planter having similar proportions to the planter 20. In this embodiment, the upper region 28 and peripheral lip 30 of the second planter are removed. Upon removal of these portions, the second planter is inverted to become the first cover 22. Protrusions 38a and 38b are attached to the proximal 36p and distal 36d faces by means of glues, thermal fusion, screws, rivets, or any other suitable attachment means. In a preferred embodiment, the protrusions 38a and 38b are made from the removed peripheral lip 30. Fixtures 42 and clasping mechanisms 40 are then attached to the protrusions 38a and 38b. These, too, can be added by a variety of means, including, but not limited to, glues, thermal fusion, screws, and rivets. Vents 52 can then be cut or stamped into the first cover 22.

This embodiment lends itself commercially to a conversion kit. The user purchases two desired planters, preferably identical or at least similar in size, as well as the conversion kit. The conversion kit includes all of the components and instructions necessary to modify one of the two planters into the first cover 22. The conversion kit further includes the second cover 24 or the materials from which to create a second cover 24 that is customized for the particular style and size of the planter 20.

In most embodiments, the first cover 22 is useable as a stand-alone planter. Therefore, once the danger from animals has ended, the first cover 22 can be inverted and plants can grow in the first cover 22.

While in most embodiments, the first cover will comprise an inflexible material, in some embodiments, a first cover from a pliable material may be used. In one embodiment, a pliable material such as fabric may be used to form the first cover.

The Second Cover

As can be seen in FIG. 3, the second cover 24 has a top 60, two longitudinal sidewalls 62a and 62b, a proximal face 64p, and a distal face 64d. These surfaces of the second cover 24 define the surface of a prism that is open at the bottom so that the second cover 24 can be placed over the first cover 22. FIG. 3 further shows that the longitudinal sidewalls 62a and 62b are of a height h. The proximal 64p and distal 65d faces are of a height h'. In one embodiment, the height h of the longitudinal sidewalls 62a and 62b is greater than the height h' of the proximal 64p and distal 64d faces, such that the longitudinal sidewalls 62a and 62b extend past the proximal 64p and distal 64d faces. The purpose of the additional height on the longitudinal sidewalls 62a and 62b is twofold. First, it allows the second cover 24 to be placed over the first cover 22 without interfering with the user's operation of the clasping mechanism 40. Second, the additional height allows the second cover to rest on the protrusions 38a and 38b of the first cover 22.

Figure 8:
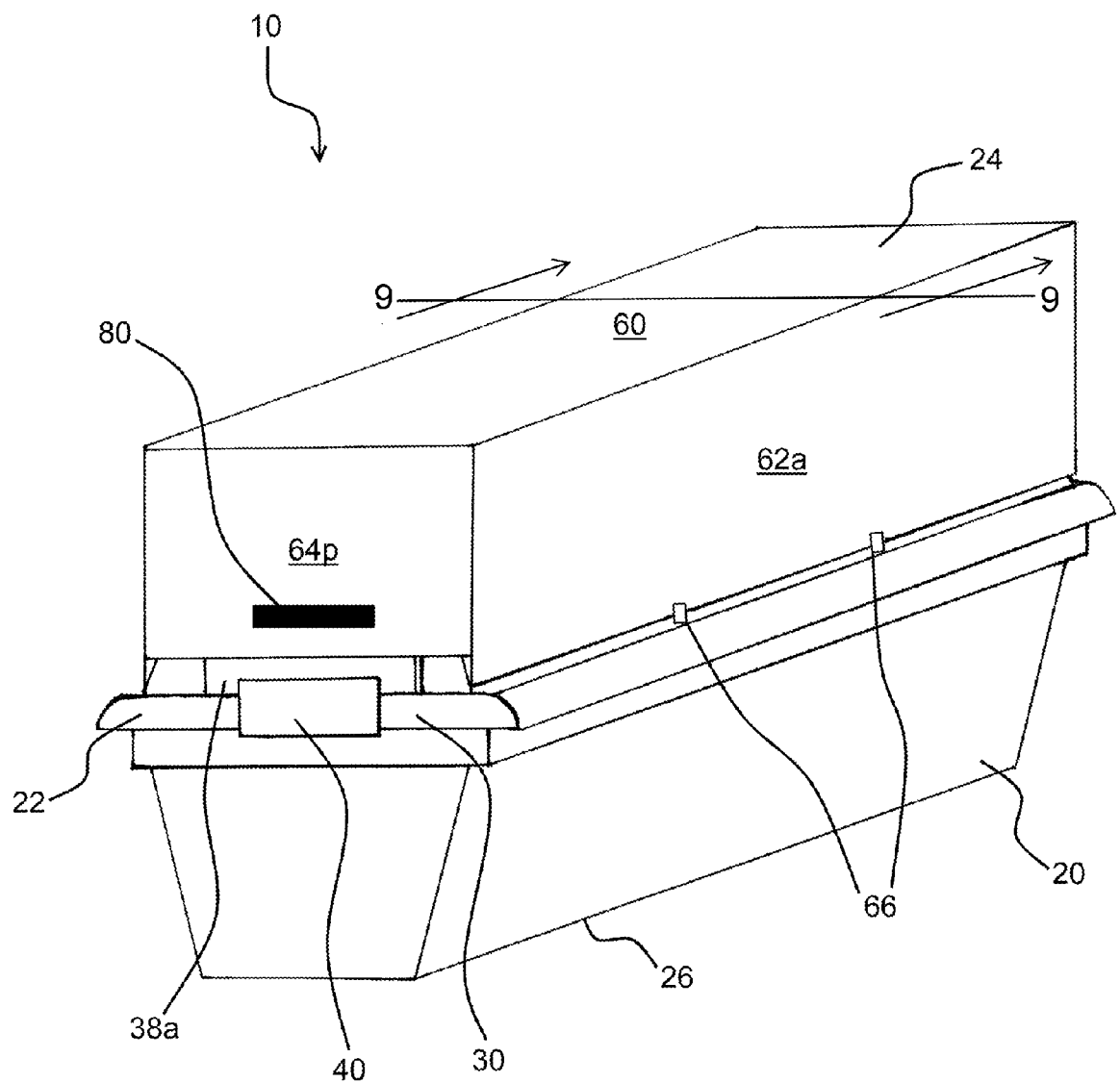
FIG. 8 is a perspective view of the planter and both covers in the closed configuration.
Figure 9:
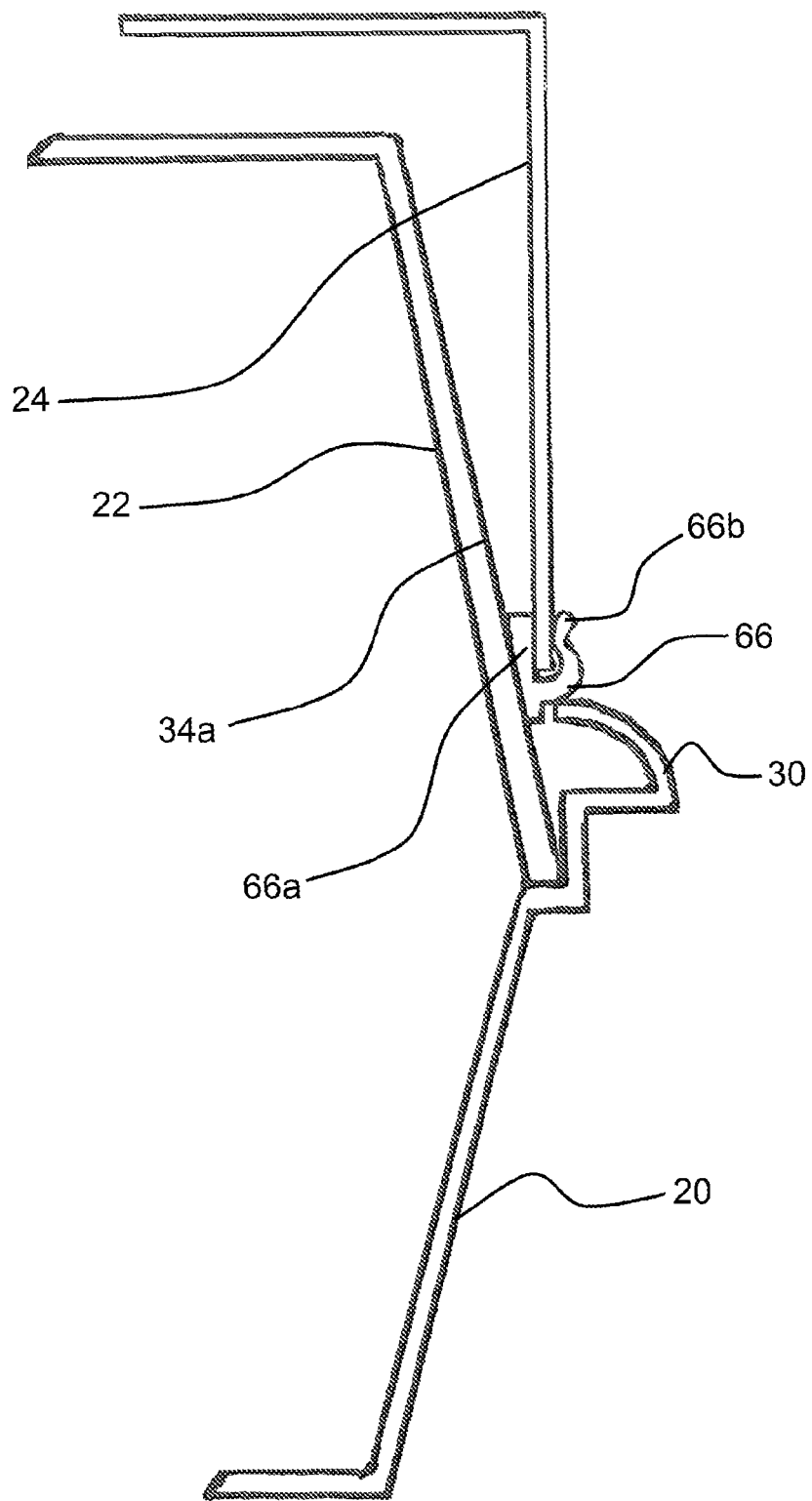
FIG. 9 is a detail view taken along line 9-9 of FIG. 8.
Figure 10A:
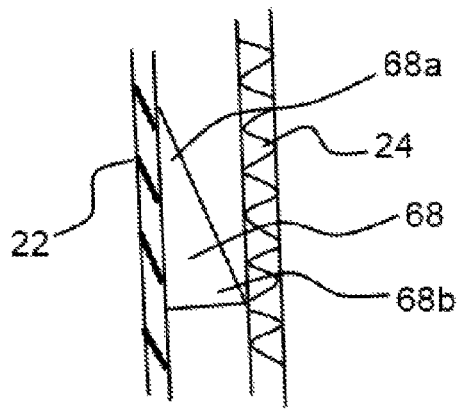
FIGS. 10A-D depict an alternative embodiment of the invention featuring leaf springs and spacers.
Figure 10B:
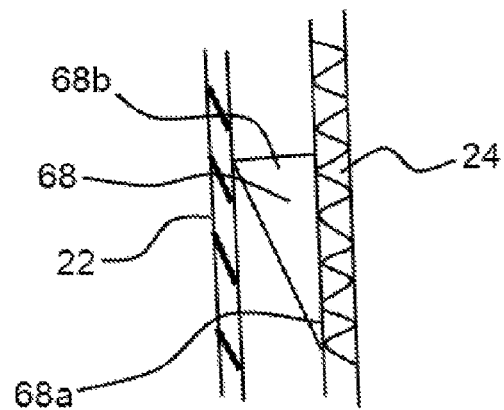
Figure 10C:
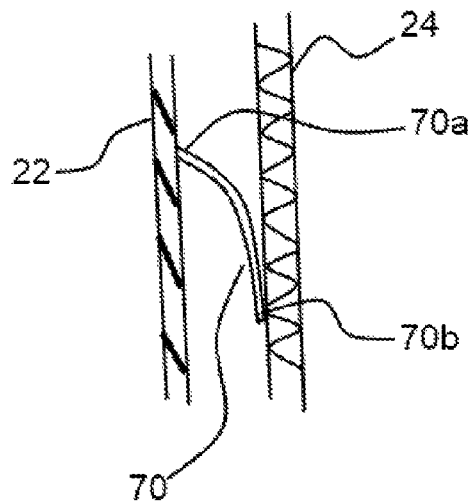
Figure 10D:
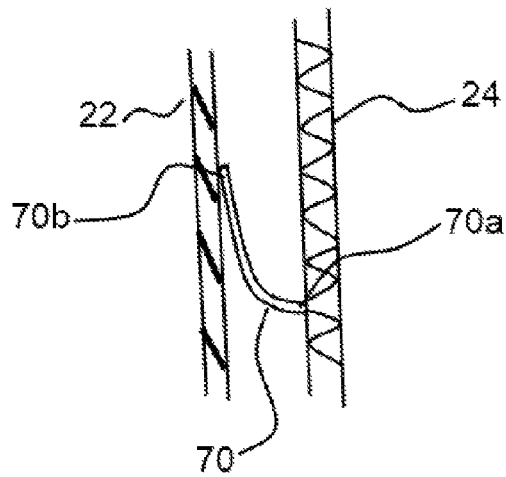

The second cover 24 is reversibly secured to the first cover 22. A multitude of securing means can be used, including pins, toggles, screws, ties, or Velcro®. As depicted in FIG. 8, the securing means are clips 66 mounted to the longitudinal sidewalls 34a and 34b of the first cover 22. In an embodiment of the present invention as depicted in FIG. 8, there are two clips 66 mounted on each longitudinal sidewall 34a and 34b of the first cover 22. As the second cover 24 is placed over the first cover 22, the longitudinal sidewalls 62a and 62b engage the clips 66. FIG. 9 is a sectional detail view taken along line 9-9 of FIG. 8, depicting a clip 66 engaging the longitudinal sidewall 62a, although it is equally descriptive of the interaction on longitudinal sidewall 62b. The longitudinal sidewall 62a slides between a first portion of the clip 66a and a second portion of the clip 66b. The second portion of the clip 66b is curved so that it must deflect from its neutral position as the longitudinal sidewall 62a is slipped past. Thus, a tight frictional engagement is created between the clip 66 and the longitudinal sidewall 62a. This frictional engagement holds the second cover 24 in place.

In another embodiment, the tight frictional engagement between the second cover 24 and the first cover 22 is created by using a multitude of spacers 68 or leaf springs 70. The spacers 68 or leaf springs 70 can be placed on the outside of the first cover 22, or the spacers 68 or leaf springs 70 may be placed on the interior of the second cover 24. As can be seen in FIGS. 10A-D, the spacers 68 are angled in such a way as to have a thin end 68a and a thick end 68b, and the leaf springs 70 have a first end 70a that is in contact with either the first cover 22 or the second cover 24 and a second end 70b that contacts the other of either the first cover 22 or second cover 24. If the spacers 68 or leaf springs 70 are placed on the outside of the first cover 22, then the spacers 68 or leaf springs 70 should be oriented so that the thin end 68a or first end 70a is directed towards the top 32 of the first cover 22. If the spacers 68 or leaf springs 70 are placed inside the second cover 24, then the spacers 68 or leaf springs 70 should be oriented so that the thin end 68a or first end 70a is directed away from the top 60 of the second cover 24. The proper orientation of the spacers 68 or leaf spring 70 is depicted in FIGS. 10A-D.

Figure 11:
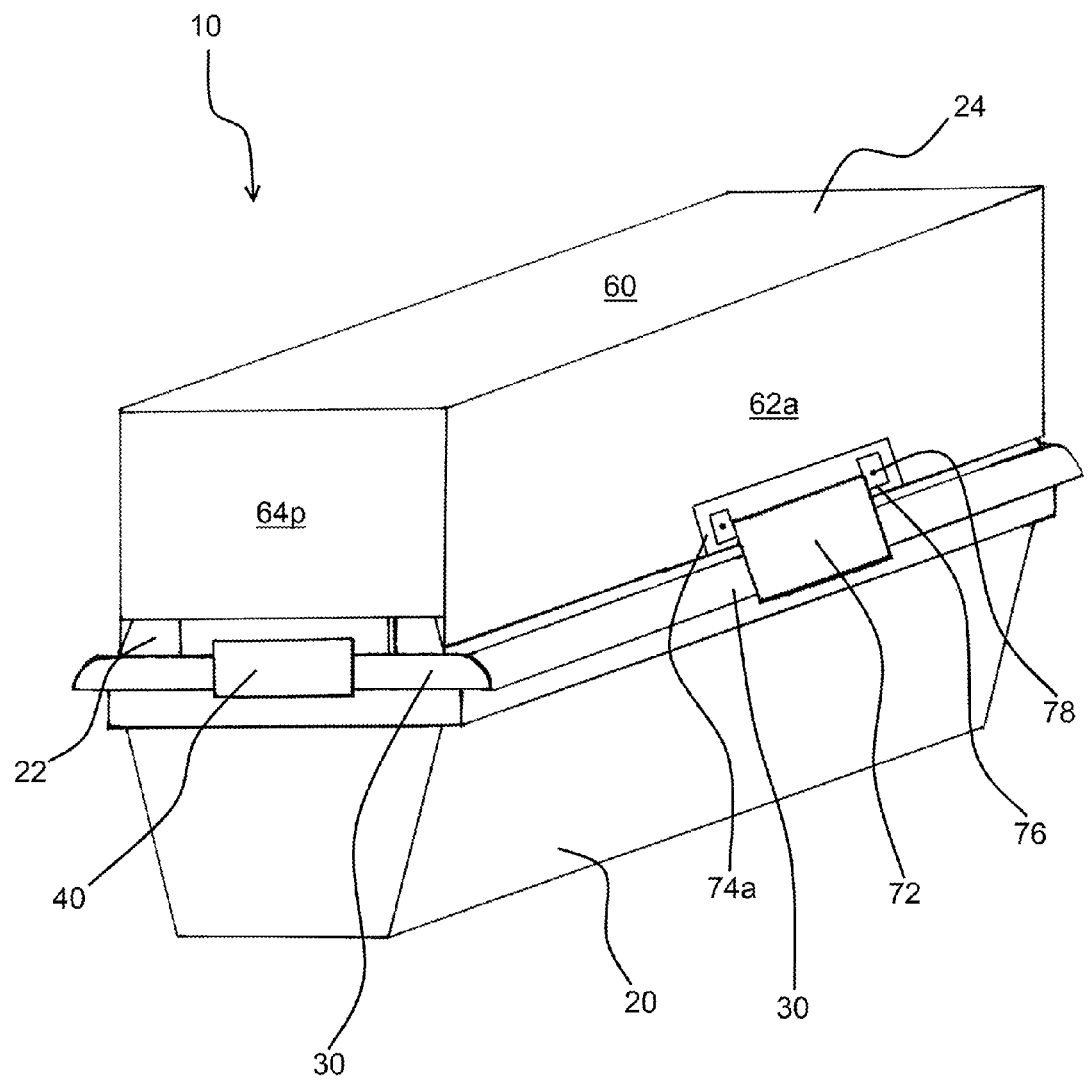
FIG. 11 depicts an alternative embodiment of the second cover featuring a clasping mechanism.

In an alternative embodiment, as can be seen in FIG. 11, the second cover 24 is attached directly to the planter 20 via secondary clasping mechanisms 72 on the longitudinal sidewalls 62a and 62b. This secondary clasping mechanism 72 is attached to the second cover 24 in a manner similar to that securing the clasping mechanism 40 to the first cover 22, including protrusions 74a and 74b, fixtures 76, and attachment means 78. The second cover 24 in this embodiment can be used independently or in conjunction with the previous embodiments using clips 66, spacers 68, or leaf springs 70. Further, in this embodiment, the second cover 24 can be used with or without the first cover 22. Thus, the protection desired by the user can be customized in that the user can employ the first cover 22 and second cover 24 together for maximum protection or independently for selective protection against garden animals or weather as necessity dictates. In the absence of the first cover 22, the longitudinal sidewalls 62a and 62b of the second cover 24 will preferably rest on the soil in the planter 20. This provides better insulation by preventing the most amount of warmed air from escaping.

The second cover 24 is designed to provide insulation against sudden frosts or cold spells. For this purpose, corrugated plastic was found to be a suitable insulating material. Corrugated plastic not only provides a rigid structural material, but the corrugations also trap a significant amount of air. Air is a poor thermal conductor, and therefore, the corrugated plastic helps prevent the loss of heat to the ambient environment. Further, the corrugated plastic would be resistant to damp weather. Another suitable material for the second cover 24 is Plexiglas®. This transparent plastic would provide sturdy protection while insulating the contents of the planter similar to a greenhouse. Other possible candidates for the cover include plastic covers lined with insulating materials, such as bubble wrap, hard foam, or gels. Metals may also be used; however, they typically have much higher heat conductance than plastics, and therefore, do not operate as well as insulators.

The second cover 24 may also contain grips 80 along any or all of the longitudinal sidewalls 62a and 62b, the proximal face 64p, or the distal face 64d. These grips 80 would allow the user to more easily attach and remove the second cover 24 from the first cover. The grips 80 may take the form or protruding handles, indentations, or high friction regions on the surface of the second cover 24. Protruding handles are depicted as the grips 80 in FIG. 8.

During storage, in one embodiment, the second cover is collapsible. In other embodiments, the second cover is nestable with other covers during the off-season.

Rimless Planters and Pots

The present invention is equally applicable to a planter 20 that lacks a peripheral lip 30 (hereinafter described as "rimless"). For example, terra cotta pots do not typically feature a peripheral lip 30, such as that of the previously described planters 20. Like the previous embodiment, the rimless embodiment 100 features a rimless planter 110, a first cover 112, and a second cover 114.

Figure 12:
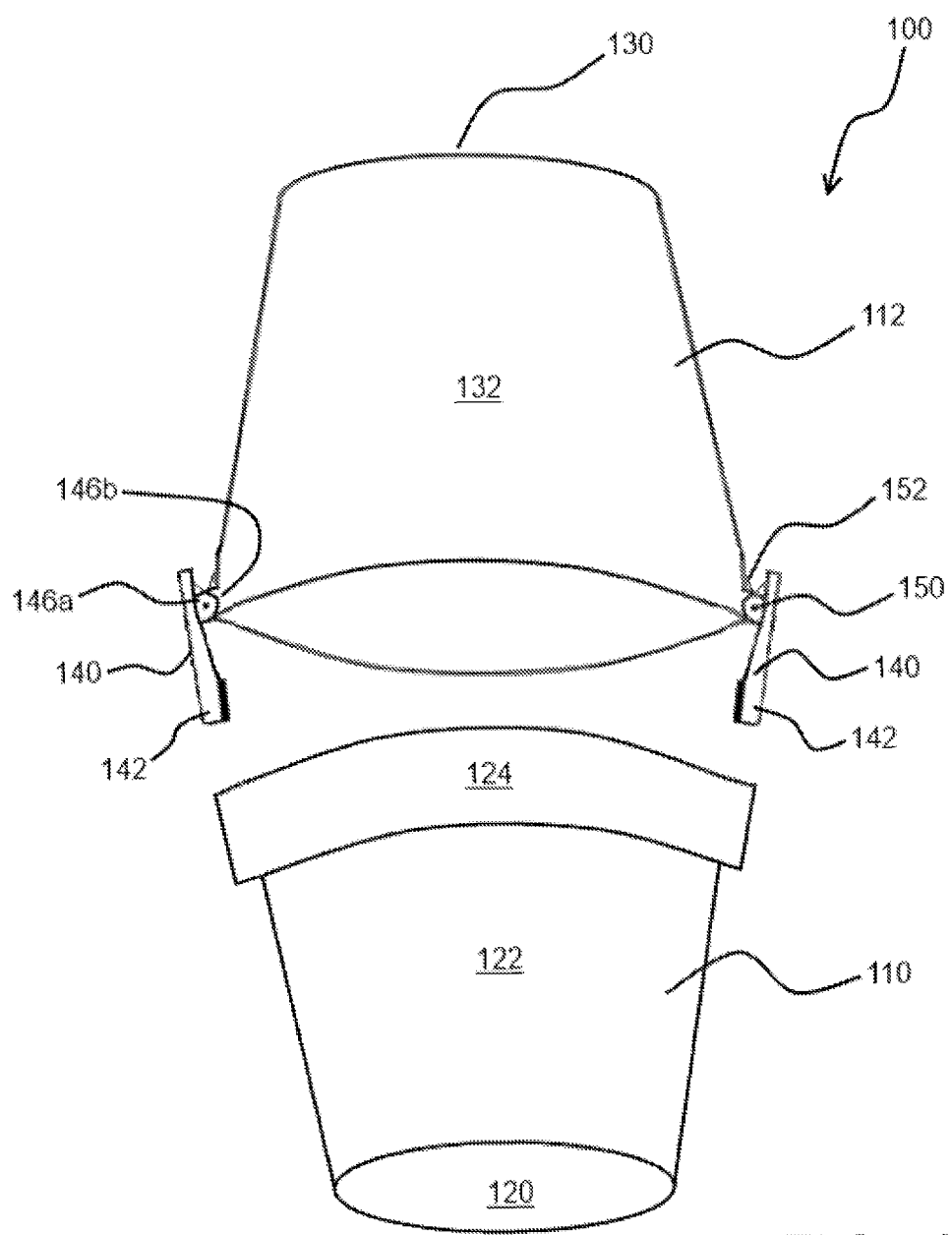
FIG. 12 depicts an embodiment of present invention adapted for use with rimless planters and pots.

While the present embodiment is capable of being used with any rimless planter 110, the following discussion and related drawings will describe a terra cotta pot. The rimless planter 110 features a bottom 120, perimeter wall 122, and a top region 124. As depicted in FIG. 12, the perimeter wall 122 extends upwards vertically from the bottom 120 and terminates at the top region 124, essentially defining the frustum of an inverted cone with a closed bottom 120 and an open top. The planter 110 may include additional features, such as drainage holes or decorative markings.

The first cover 112 has a top 130, outer wall 132 and an open bottom region. As depicted in FIG. 12, the outer wall 132 extends downwardly from the top 130, defining a frustum with a closed top and an open bottom. The first cover 112 is positioned over the planter 110 such that the open bottom of the first cover 112 is over the open top of the planter 110.

In order to adapt the present invention to these types of rimless planters and pots, a different clasping mechanism 140 must be utilized. As described in the previous embodiment, the depending end 46 of the clasping mechanism 40 deflects the peripheral lip 30 to lock into place. Since there is no peripheral lip on the planter of this embodiment, the clasping mechanism 140 instead uses frictional force to engage the top region 124 of the planter 110. The clasping mechanism 140 has a depending end 142 that features a gripping surface 144. In order to provide a tight frictional engagement, the clasping mechanism 140 must continuously provide force sufficient to keep the gripping surface 144 in contact with the top region 124 of the planter 110.

Figure 13:
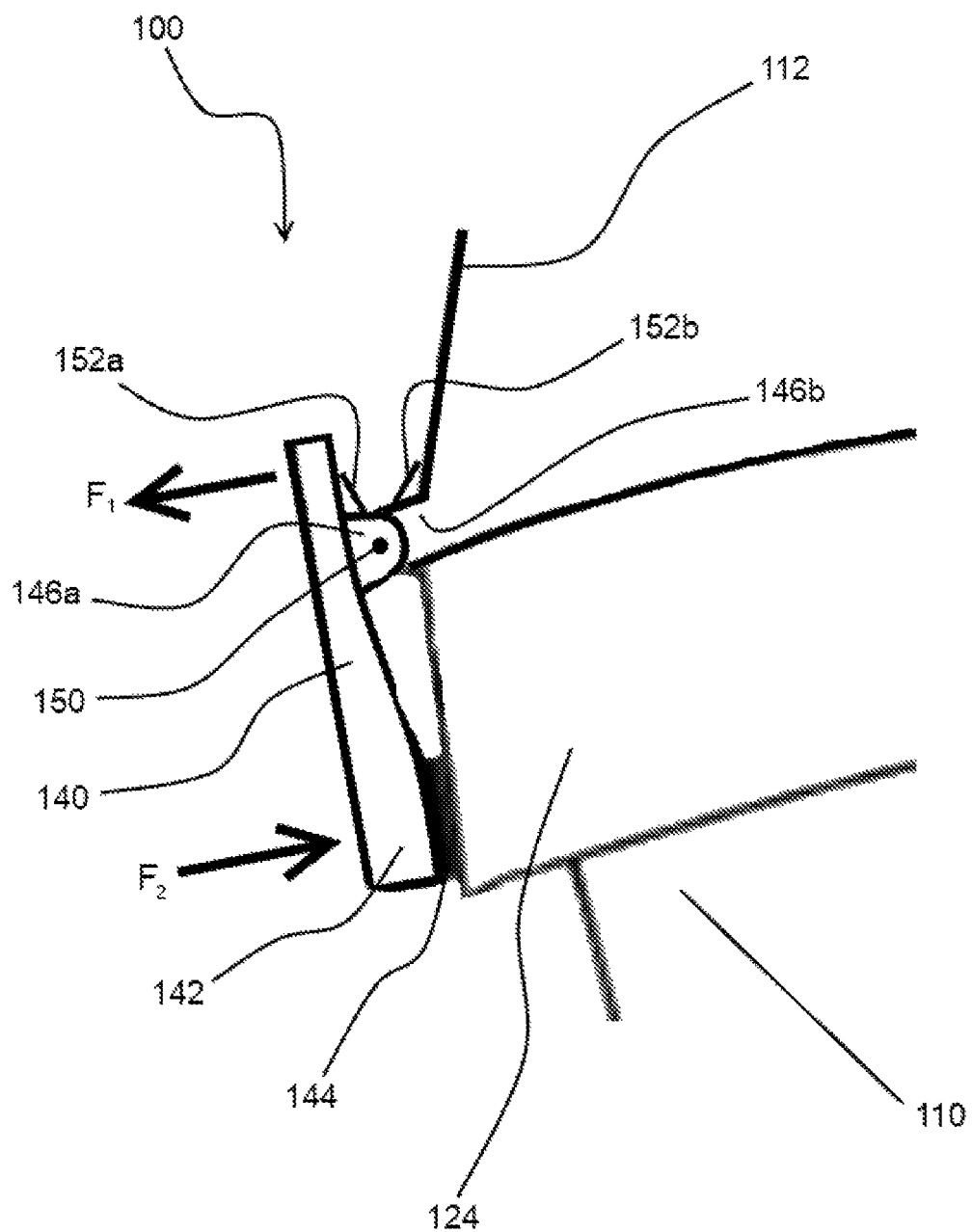
FIG. 13 depicts a detail view of the spring biased clasping mechanism in accordance with the features of the present invention.

Spring biasing the clasping mechanism 140 has been found to be a suitable means of providing sufficient force. An embodiment of the first cover 112 featuring a spring biased clasping mechanism 140 is depicted in detail in FIG. 13. As depicted there, the clasping mechanism 140 is joined to the first cover 112 via attachment arms 146a and 146b. Each attachment arm 146a and 146b has a through-hole 148 into which a pin 150 is inserted. The pin 150 serves as a support for a torsion spring 152. The torsion spring 152 has a first arm 152a in contact with the clasping mechanism 140 and a second arm 152b in contact with the first cover 112. In this way, the arms of the torsion spring 152 provide an outward force $F_1$ on the clasping mechanism 140. Given that the clasping mechanism 140 is attached via a pin 150, the outward force on the top of the clasping mechanism 140 is translated to an inward force $F_2$ on the depending end 142 via the torque about the pin 150. This force keeps the gripping surface 144 in tight frictional engagement with the top region 124 of the planter 110. Materials suitable for use as the gripping surface 144 include, but are not limited to, soft rubber and other elastomers, traction tape, woven fabrics, and 3M® Gripping Material.

Figures 14A, 14B:
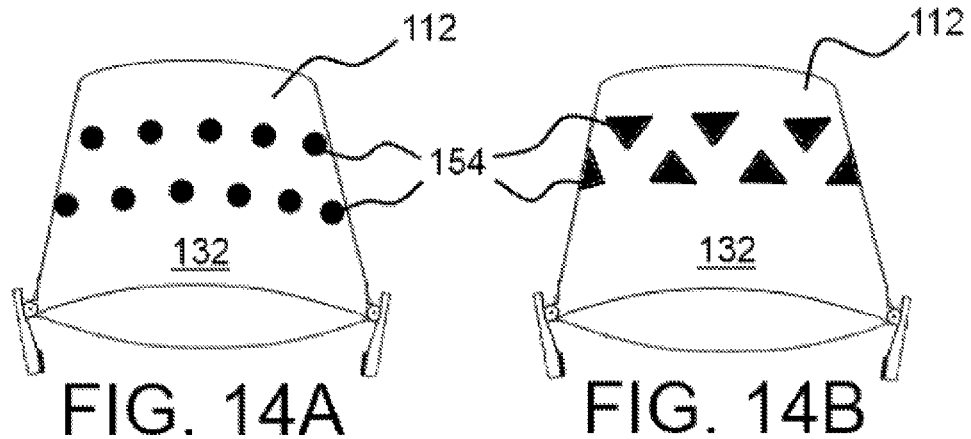
FIG. 14A-D depicts exemplary vents in the first cover of the rimless embodiment.
Figures 14C, 14D:
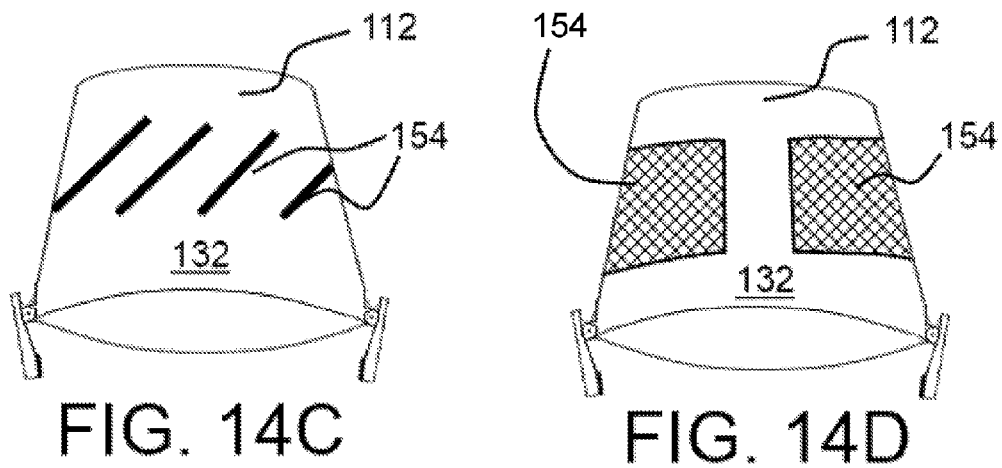

As in the previous embodiment, the first cover 112 may feature a plurality of vents 154. These vents 154 provide sunlight, airflow, and moisture to the plants, seeds, seedlings, and bulbs in the planter 110. The vents 154 can be in the form of a variety of geometric patterns including, but not limited to, circular holes (FIG. 14A); triangular cutouts (FIG. 14B); long, narrow slits (FIG. 14C); or a combination of the foregoing. Further, these vents 154 can be covered with mesh (FIG. 14D). If the vents 154 are not covered with mesh, then the vents 154 need to be of a size small enough to prevent access by garden animals.

Figure 15:
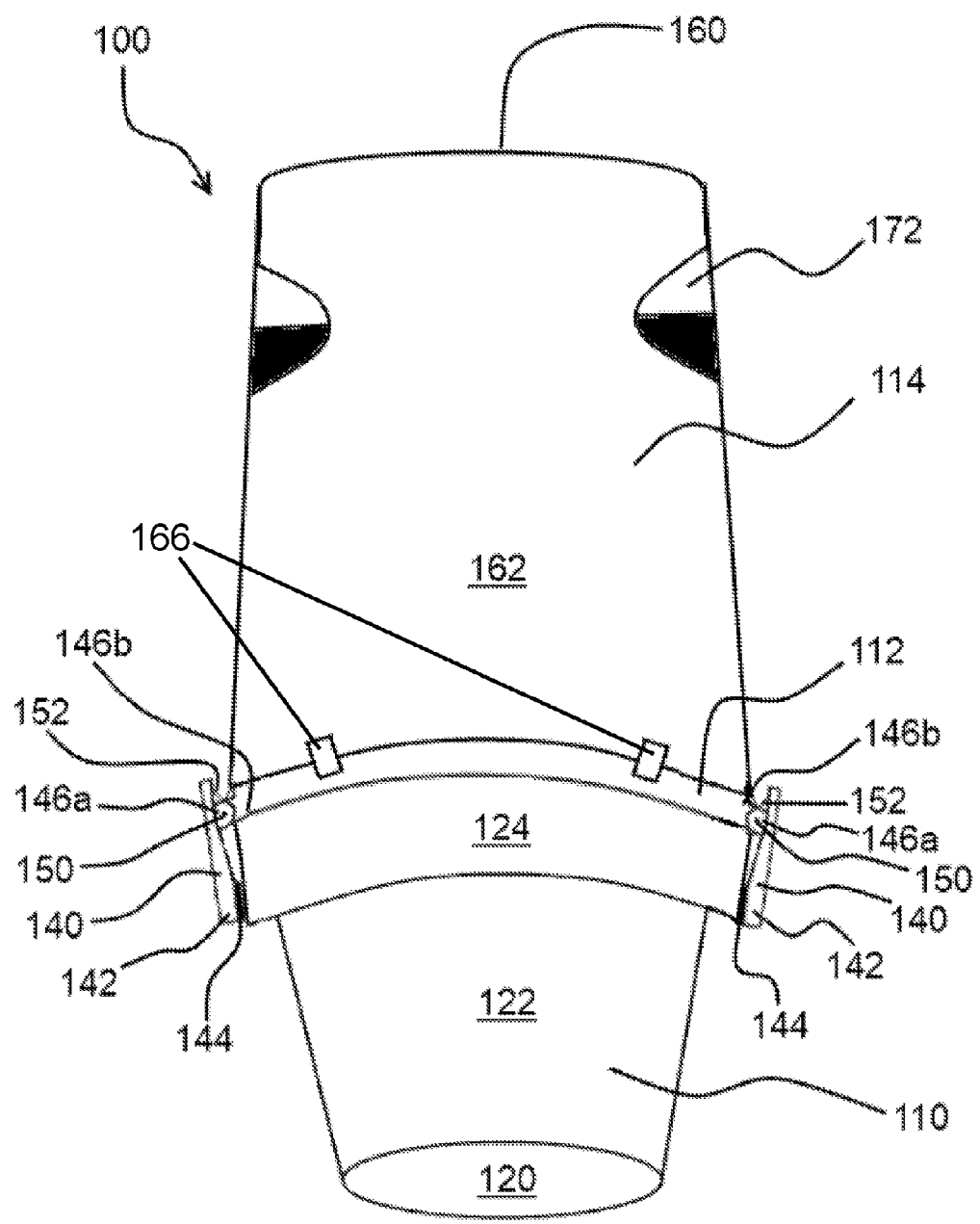
FIG. 15 depicts the rimless embodiment in the closed configuration with both covers.

The second cover 114 has a top 160 and an outer wall 162. The outer wall 162 depends from the top 160 such that an open region characterizes the bottom of the second cover 114. The second cover 114 is placed over the first cover 112. A depiction of the rimless embodiment in the closed configuration is shown in FIG. 15. As with the previous embodiment, a variety of structures 166 can be used to provide a firm engagement between the first cover 112 and the second cover 114. For example, clips, spacers, and leaf springs are all possible structures 166. Suitable materials for construction of the second cover 114 include, but are not limited to, corrugated plastic, Plexiglas®, and plastic covers lined with insulating materials, such as foams, gels, or bubble wrap.

Figure 16:
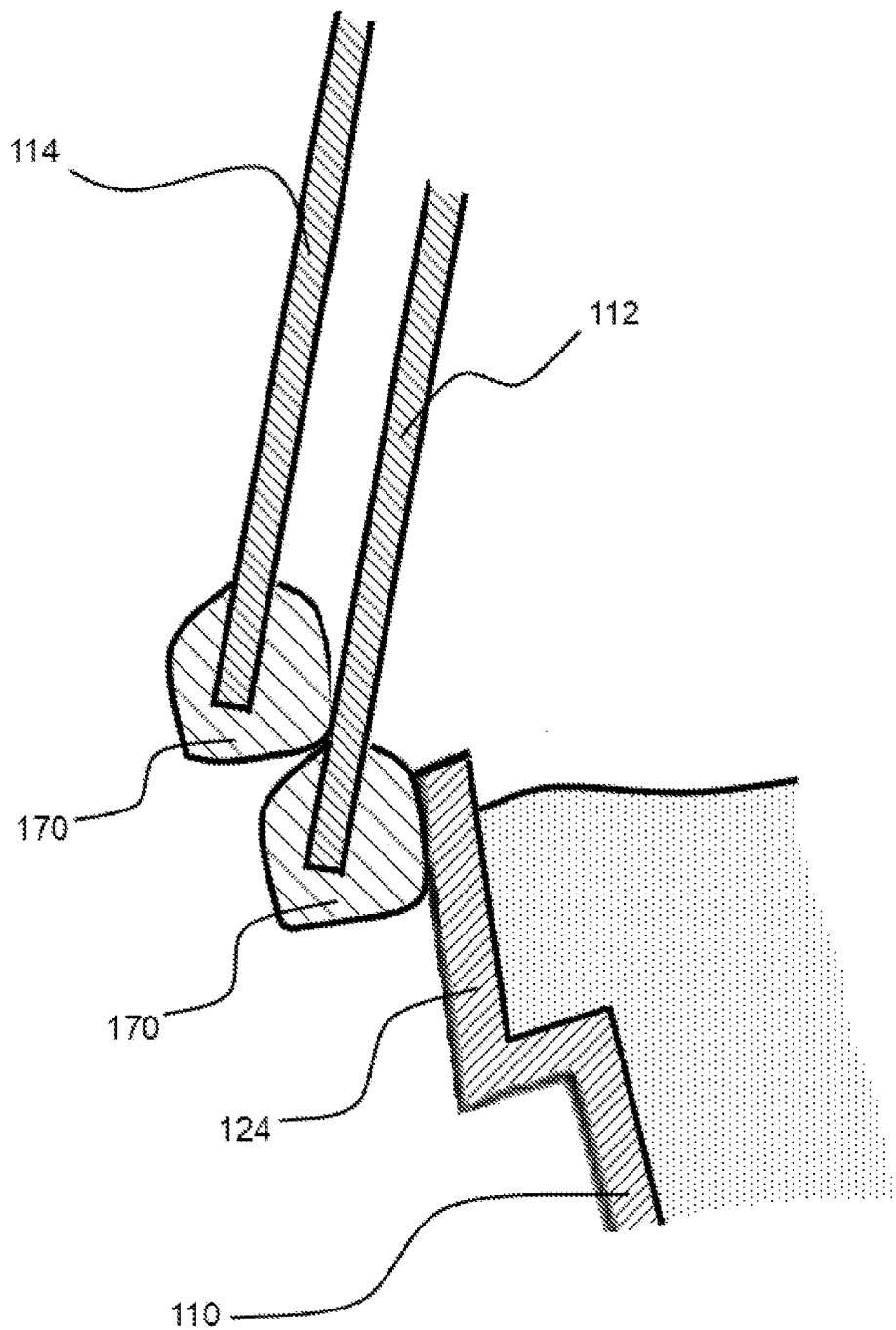
FIG. 16 depicts a detail view of a variation of the rimless embodiment featuring a gasket seal in accordance with the features of the present invention.

In another rimless planter embodiment, the first cover 112 is securely attached to the planter 110 via a gasket 170. As depicted in FIG. 16, the gasket 170 defines a channel to engage the bottom of the outer wall 132 of the first cover 112. The open bottom of the first cover 112 is designed to accommodate the top of the perimeter wall 122 of the planter 110; although, the seal between the gasket 170 and planter 110 could also be created on the interior of the planter 110 with the perimeter wall 122 of the planter 110 designed to accommodate the bottom of the outer wall 132 of the first cover 112. The gasket 170 provides a tight seal between the first cover 112 and the planter 110. Suitable materials for the gasket 170 include soft deformable materials, such as rubber, silicone, neoprene, and nitrile rubber to name a few. The second cover 114 could be attached via the structures 166 of the previous embodiment, or the second cover 114 could also feature a gasket 170 to provide a tight frictional engagement between the first cover 112 and the second cover 114. As depicted in FIG. 16, the second cover 114 is attached with a gasket 170. The first cover 112 still optionally contains such features as the vents 154, and the second cover 114 optionally includes handles 172. Additionally, the gasket 170 on the second cover 114 can provide a tight frictional engagement between the second cover 114 and the planter 110. In this way, the second cover 114 can be used to provide insulation for the planter 110 independently of the first cover 112.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description.

The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112(f) unless and until such claim limitations expressly use the phrase "means for" followed by a statement of function void of further structure.

The present methods can involve any or all of the steps or conditions discussed above in various combinations, as desired. Accordingly, it will be readily apparent to the skilled artisan that in some of the disclosed methods certain steps can be deleted or additional steps performed without affecting the viability of the methods.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The invention claimed is:
1. An apparatus for plants, said apparatus comprising:
a) a planter with a closed bottom, sidewalls, and an open top, wherein a protruding lip having a topside and an underside is defined on an exterior surface of the sidewalls in proximity to the open top;
b) a first cover with an open bottom, sidewalls, and a closed top, wherein a set of clasping mechanisms are located on at least two opposing sidewalls in proximity to the open bottom, wherein the clasping mechanisms reversibly engage the underside of the lip of the planter, and wherein the open bottom of the first cover is inserted into the open top of the planter such that, when the first cover is inserted into the planter and clasped in place, the open bottom of the first cover is prevented from rising above the open top of the planter; and
c) further comprising a second, insulating cover with an open bottom, sidewalls, and a closed top, wherein the second cover is received by the first cover after the first cover is reversibly attached to the planter.

2. The apparatus of claim 1, wherein the first cover has holes formed into the closed top to facilitate passage of water and air to the planter.

3. The apparatus of claim 1, wherein said first cover further comprises at least one cross piece on an interior surface distally spaced from the open bottom.

4. The apparatus of claim 3, wherein the at least one crosspiece is located between 0 and 2 inches from the closed bottom.

5. The cover of claim 3, wherein said second cover has holes formed into the closed top so as to allow passage of water, air, and sunlight.

6. The cover of claim 3, wherein holes acting as vents are defined in the first cover wherein the holes in said first cover are covered by a mesh screen.

7. The apparatus of claim 1 wherein said first cover is useable as a stand-alone planter.

8. The apparatus of claim 1 wherein said first cover comprises an inflexible material.

9. The cover of claim 1, wherein the set of clasping mechanisms further comprises a gripping surface adapted to frictionally engage the planter.

10. The insulating cover of claim 1, wherein said second insulating cover is made of corrugated plastic.

11. The insulating cover of claim 1, wherein said second insulating cover is made of a transparent thermoplastic.

12. The insulating cover of claim 1, wherein said second insulating cover is collapsible during storage.

13. The second insulating cover of claim 1 further comprising a plurality of clasping mechanisms on sidewalls of said second insulating cover, wherein the plurality of clasping mechanisms are designed to engage a preexisting planter.

14. An apparatus for plants, said apparatus comprising:
 a) a planter with a closed bottom, sidewalls, and an open top, wherein a protruding lip is defined on an exterior surface of the sidewalls in proximity to the open top;
 b) a first cover with an open bottom, sidewalls, and a closed top, wherein a set of clasping mechanisms are located on two opposing sidewalls in proximity to the open bottom, and wherein the clasping mechanism reversibly attaches the cover to the lip of the planter; and
 c) a second, insulating cover with an open bottom, sidewalls, and a closed top, wherein the second cover is received by the first cover after the first cover is reversibly attached to the planter, wherein the second, insulating cover is collapsible during storage.

* * * * *